United States Patent [19]

Sickles

[11] 4,029,406
[45] June 14, 1977

[54] MICRO FICHE HANDLER

[76] Inventor: Ralph A. Sickles, 1418 Steamboat Bend, Tempe, Ariz. 85281

[22] Filed: July 6, 1976

[21] Appl. No.: 702,475

[52] U.S. Cl. .............................. 353/27 R; 74/84 R; 214/1 BB; 353/108
[51] Int. Cl.² .................. G03B 23/08; F16H 27/04
[58] Field of Search .............. 353/27 R, 27 A, 108; 74/84; 214/1 BB, 1 BT, 95

[56] References Cited

UNITED STATES PATENTS

| 2,716,293 | 2/1973 | Kitano et al. | 353/27 R |
|---|---|---|---|
| 2,991,656 | 7/1961 | Caudle et al. | 74/84 |
| 3,751,153 | 8/1973 | Naito | 353/27 R |
| 3,778,141 | 12/1973 | Peterpaul | 353/27 R |
| 3,868,179 | 2/1975 | Zeutschel | 353/27 R |
| 3,873,194 | 3/1975 | Schwartz | 353/27 R |

FOREIGN PATENTS OR APPLICATIONS

| 2,434,569 | 1/1976 | Germany | 353/27 R |

Primary Examiner—Steven L. Stephan

[57] ABSTRACT

The disclosure relates to a micro fiche transport means adapted to transport a micro fiche in rectilinear directions at right angles to each other for projection relative to a plurality of micro photos carried thereby; the transport means having a plurality of parallel rows of indexing portions disposed at right angles to each other and intersecting each other and also a rectilinear track means and a plurality of generally herring bone shaped cam means operable by a rotary cam member which is limited by a single or partial revolution clutch.

15 Claims, 13 Drawing Figures

MICRO FICHE HANDLER

BACKGROUND OF THE INVENTION

Various prior art photo display projectors have utilized generally circular cards containing a large number of individual photographic films carried thereon in a generally spiral array. However, such mechanisms have not been suitable for the rectilinear transport of a generally rectangular card of member commonly known as a micro fiche, which carries a great plurality of generally rectangular photo elements in rectangularly spaced apart relation to each other. The aforementioned micro fiche is particularly related to micro film and/or conventional computerized data handling machines.

Even though prior art machines have been developed for properly handling such micro fiche relative to projectors, they include quite complex electronic and/or electromechanical means for controlling the movements of the micro fiche in two directions at substantially right angles to each other in order individually to project an image relative to each photo film carried on the micro fiche. Accordingly, it has heretofore been a problem to provide a very simple and mechanical device to provide for the rectilinear transport of such micro fiche relative to the lens of a projector so as to display one film element at a time with relation to the projector and in desired succession. It has also been a problem to afford such a rectilinear transport means within a simple mechanical configuration which is inexpensive, reliable and easy to service and maintain.

Further, it has been a problem to provide such a mechanical system which may be produced by simple plastic injection molding methods or the like.

SUMMARY OF THE INVENTION

The preent invention relates to a rectilinear transport means particularly adapted for use in the transport of rectangular arrays of photographic films relative to projectors or the like; the invention being especially adapted for use in actuating a conventional micro fiche in relation to a projector or viewer. The rectilinear transport means of the invention comprises a simple mechanical arrangement wherein a rotary actuator, or rotary cam member, rotates in one direction only and engages indexing means on a generally rectangular plate or the like and the rotary cam engages the indexing means which is in a generally rectangular arrangement involving rows of indexing portions which are generally parallel and second rows disposed at right angles thereto and intersecting the aforementioned rows such that the indexing portions are common to both rows at right angles to each other.

The rows of indexing portions are related to a serpentine track structure which is formed of a plurality of opposed and continuous U-shaped portions of rectangular shape. The track portion cooperates with the indexing portion such that the rotary cam or actuator progressively engages the indexing means in one straight row and then the indexing means is moved laterally in accordance with the direction of the track means to another row and proceeds in the opposite direction. In this manner, the indexing means are placed 180° out of phase with relation to the rotary cam during reversal of the indexing plate so that the rotary cam may rotate in the same direction at each end of each row and reverse the directional movement of the entire indexing and the indexing portions thereon.

The indexing means is thus adapted for use in connection with a micro fiche holder which is moveable relative to a projector or the like. The present invention comprises a single indexing plate which has the aforementioned intersecting rows of detent portions on one side, together with a serpentine continuous track formed by opposed and adjacent U-shaped track portions in continuity with each other, and the indexing plate on the opposite side thereof is provided with rows of herring bone shaped cam portions directed generally at right angles to the parallel portions of the U-shaped portions of the serpentine track aforementioned, such that a rotary cam may engage the serpentine portions and move the indexing plate successively back and forth longitudinally of said rows of indexing portions. Whereby, the serpentine shaped cam portions have alternately varying angular portions which intersect in coinciding relation with the indexing portion such that a succession of the herring bone shaped cam portions may be engaged by a rotary cam member when the indexing plate is being moved in one direction and cam portions of the herring bone cam structure extending at another angle may be engaged when the indexing plate is being moved in the opposite direction. The invention comprises a frame having a spring loaded detent means and a guide means; the detent means being spring loadably moveable into and out of generally recessed detent portions of the detent means; while the guide means of the invention, mounted on the frame, forces indexing plate to follow a serpentine path in accordance with a rectilinear serpentine track engaged by the afore-mentioned guide means.

The guide means and the indexing detent means are mounted on a moveable member which may be pivoted or otherwise moved out of engagement with the indexing plate to allow freedom to reset or move the plate manually. Whereby, when the mounting means carrying the spring loaded indexing means and the quide means is locked into position such that the spring loaded indexing detent means is engaged with the detents of the indexing plate, the guide means also disposed in the serpentine track of the indexing plate.

The invention comprises a rotary actuator or rotary cam means, which is turned by hand or driven by a motor and a single revolution clutch which limits the cyclic operation of the rotary cam to 360° of rotation or a lesser pivotal movement for each individual operation, to thereby cause the cam means to move the indexing means a distance equal to the spacing of the indexing portions thereon. Whereby, at one end of a row of indexing portions, the aforementioned track means forces the rotary cam means to actuate the indexing plate in a direction at right angles to the next successive row of indexing portions whereupon successive operations of the rotary cam causes the indexing plate to move in an opposite direction, thus following a generally U-shaped pattern of movement alternately to traverse the serpentine path and to move a micro fiche successively from one photographic film to the next one in relation to a projector; such operation being due to the equal spacing of the indexing portions of the indexing plate relative to the equal spacing of photo films on the micro fiche carried by a carriage in connection with the indexing plate of the invention; the indexing plate and the carriage being connected together and moveable in two directions at right angles to each other relative to the frame of the invention and all being controlled by actuation of the rotary actuator of cam means operating in one direction and successively moving the cam plate a distance equal to the spaced apart relationship of the adjacent indexing portions thereon and which also corresponds to the spacing of the photo films carried by the micro fiche.

The cam plate of the invention contains features, including actuating cam portions, indexing portions and a serpentine track portion; all of which may readily be formed in a single molding operating such as is common to the industry of plastic molding or plastic injection molding. Therefore, the basic geometric elements of the invention may be produced very economically and precisely from materials very compatible with the mechanical operation of the invention.

Accordingly, it is an object of the invention to provide a very simple rectilinear transport means which may be precisely and economically produced in accordance with plastic injection molding practices, and which will operate with precision in the indexing of micro fiche which carry a large number of photo films thereon.

Another object of the invention is to provide a rectilinear transport means adapted to move to a great plurality of stations, all disposed in a rectilinear array, and all being accomplished with simple mechanical means.

Another object of the invention is to provide a very simple and economical rectilinear transport means for use in connection with the functions, such as display projectors or the like, which are used in displaying photos carried on a conventional micro fiche.

Another object of the invention is to provide a simple rectilinear transport means having a rotary actuator or cam means adapted to successively engage indexing portions which are each individually arranged in spaced relation to each other and in rows parallel to each other and whereby the rotary actuator or cam means rotates in one direction and is provided with a phase shifting means at opposite ends of the rows, so as to progressively move the indexing means in one direction by means of one row of indexing portions and then in the opposite direction by means of the next adjacent row of indexing portions, during which the rotary actuator or cam means continues to rotate in the same direction.

Another object of the invention is to provide a rectilinear actuator having the foregoing features and in addition utilizing a single revolution clutch or the like for controlling the rotary actuator which progressively moved the indexing means from one station to another, or from one indexing portion to another.

Another object of the invention is to provide a rectilinear transport means which is very simple and economical to produce and maintain, and particularly in proportion to the functions that the rectilinear transport means accomplishes.

Further objects and advantages of the invention may be apparent from the following specification, appended claims and accompanying drawings.

DESCRIPTION OF THE PREFERRED EMBODIMENTS

Figure 1:
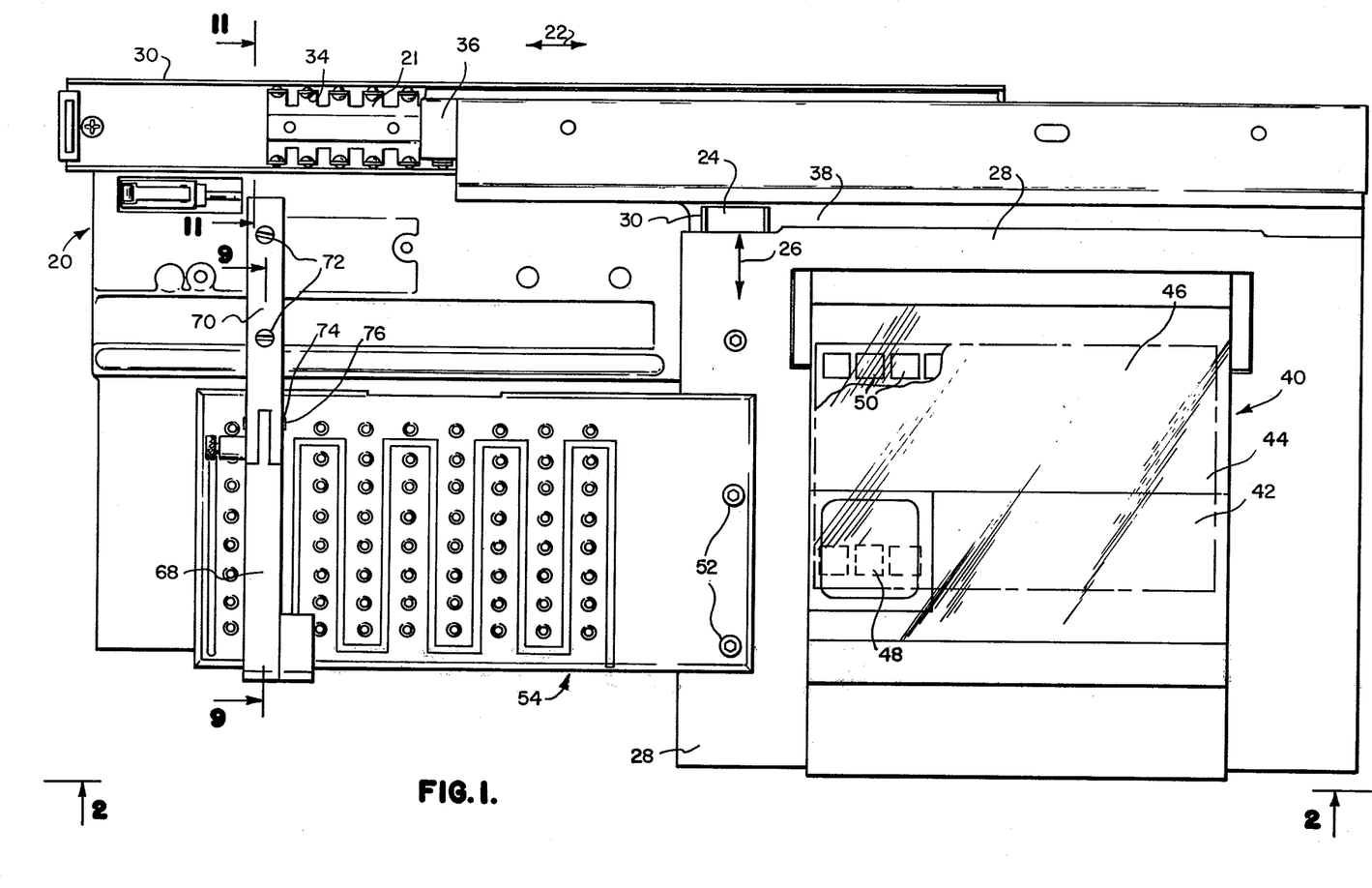
FIG. 1 is a top or planned view of a rectilinear micro fiche transport means of the invention.
Figure 2:
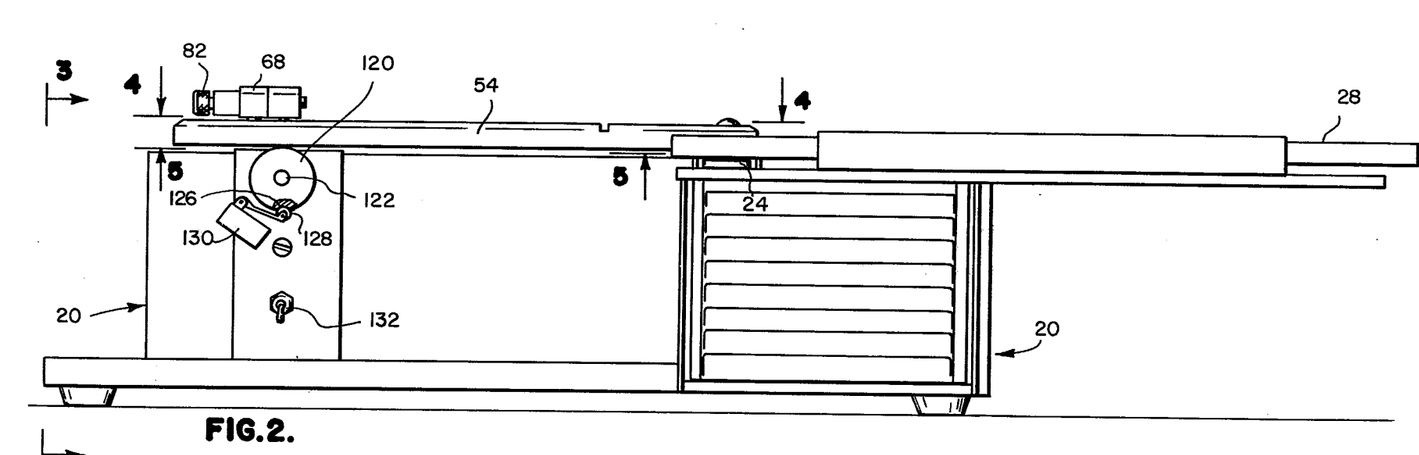
FIG. 2 is a side elevational view thereof taken from the line 2—2 of FIG. 1.

As shown in FIG. 1 of the drawings, the rectilinear micro fiche transport means of the invention is provided with a frame 20 having a conventional rectilinear slide mechanism 21 moveable backward and forward in the directions of the double ended arrow 22 and also carried on the frame 20 is another slide mechanism 24 moveable back and forth in the direction of an arrow 26 at right angles to the arrow 22; it being noted that the slide mechanism 24 is carried by the slide mechanism 21 and a carriage 28 is carried by a complimental portion of the slide mechanism 24.

Figure 11:
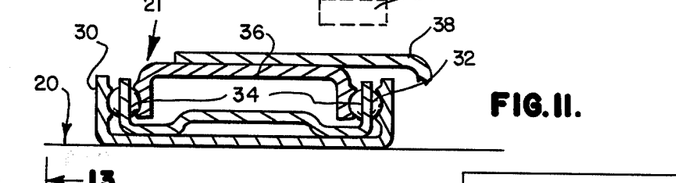
FIG. 11 is an enlarged fragmentary sectional view taken from the line 11—11 of FIG. 1.

As shown in FIG. 11, it will be seen that the frame 20 carries a stationary element 30 of the slide mechanism 21. An intermediate ball bearing retainer 32 carries ball bearings 34 adjacent to which a channel shaped slide member 36 operates. This slide member 36 supports a cantilever supporting plate 38 on which the slide mechanism 24 is mounted.

The slide mechanism 24 is identical to that shown in FIG. 11 and is provided with a member 36 which supports the carriage 28 shown in FIG. 1 of the drawings.

Supported on the carriage 28 is a micro fiche holder 40 which consists of superimposed transparent plates 42 and 44 between which a micro fiche film support 46 may be held and which may be moved relative to a stationary light source 48 for projecting images from spaced apart micro photographs 50 of the slide fiche 46.

Accordingly, the slide fiche 46 on the carriage 28 is moveable in both directions of the arrows 22 and 26 which are generally at right angles to each other.

Fixed to the carriage 28 by means of suitable fixtures such as screws 52 is an indexing means 54 which preferably consists of a single plate having features which cooperate with indexing detent means, track guide or follower means and also a rotary cam drive means, as will be hereinafter described in detail.

Figure 4:
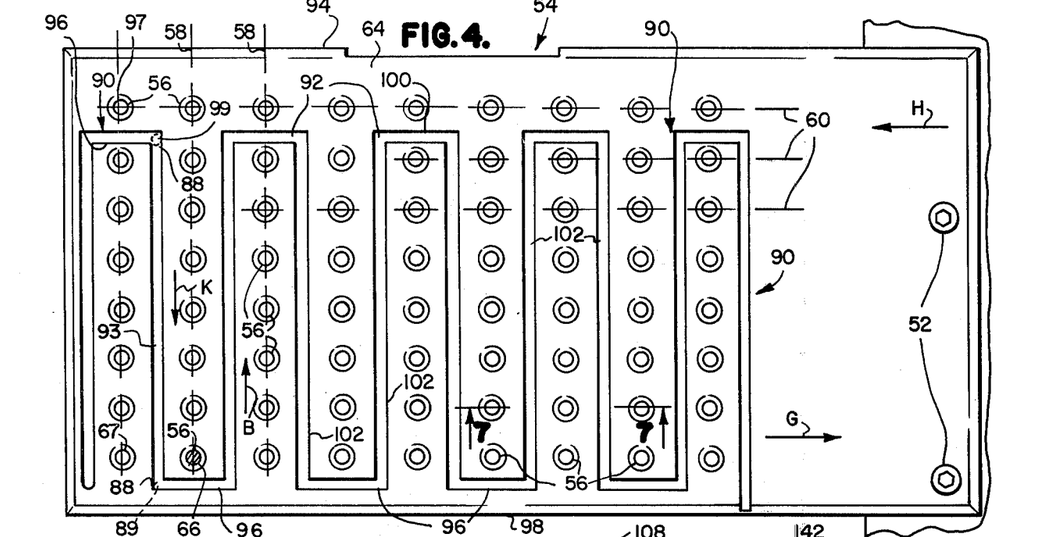
FIG. 4 is a fragmentary top or planned view taken from the line 4—4 of FIG. 2 showing details of the indexing plate means of the invention.

The indexing means 54 shown in FIG. 4 of the drawings, is provided with a plurality of parallel rows of indexing portions 56; said parallel rows being designated by broken lines 58. The indexing portions 56 are also aligned in rows designated by broken lines 60.

These rows 60 are at right angles to the rows 58 and it will be understood that the indexing portions 56 are common to both rows 58 and 60.

Figure 7:
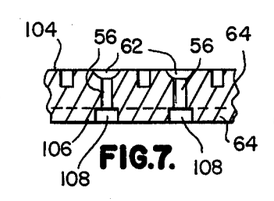
FIG. 7 is an enlarged fragmentary sectional view taken from the line 7—7 of FIG. 4.

The indexing portions 56 are, as shown in FIG. 7 of the drawings, and are in the form of recesses 62 in a plate member 64, which, as hereinbefore described, is secured by bolts or screws 52 to the carriage 28.

It will be seen that the recess portions 62 of the indexing portions 56 are engageable by a spring loaded indexing detent 66 which is resiliently loaded to readily pass into and out of the recess portions 62 of the indexing portions 56. The indexing detent 66 is carried by a movable arm 68, shown best in FIGS. 1, 9 and 10 of the drawings.

Figure 9:
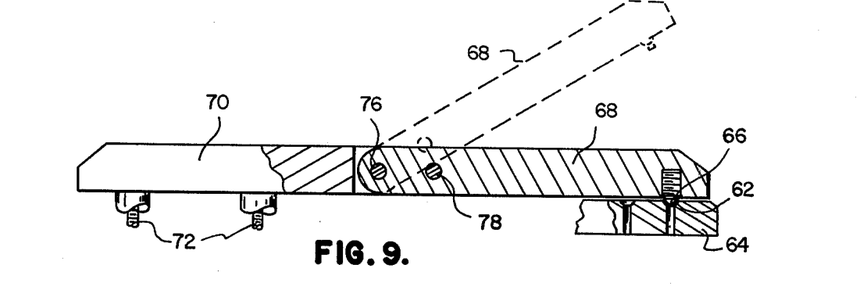
FIG. 9 is an enlarged fragmentary sectional view taken from the line 9—9 of FIG. 1.

This arm 68 is provided with a base portion 70 fixed by screws 72 to the frame 20. The base portion 70 is provided with a hinge mechanism 74 having a hinge pin 76 extending therethrough, the details of which are shown best in FIGS. 9 and 10 of the drawings. The hinge pin 76 is provided to permit the arm 68 to move upward into the broken line position as shown in FIG. 9 to release the indexing detent means 66 from a respective indexing recess 62 in the plate 64. A locking pin 78 is disposed as shown in FIGS. 9 and 10 of the drawings to pass through the hinge structure 74 and to lock the arm 68 in the solid line position shown in FIG. 9 wherein the spring loaded indexing detent 66 is held in a position to positively engage the respective indexing recesses 62 in the plate 64.

Figure 10:
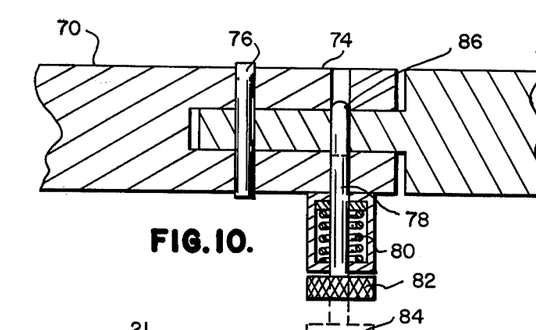
FIG. 10 is an enlarged fragmentary sectional view taken from the line 10—10 of FIG. 3.

The locking pin 78 is spring loaded by means of a spring 80 to be held in the solid line position shown in FIG. 10 and a manually engageable knob 82 in connection with the pin 78 is adapted to be retracted manually to a broken line position 84 so as to release the pin 78 at its end 86 beyond the hinge structure 74 to allow the arm 68 to pivot upward to the broken line position.

The movement of the arm 68 to the broken line position shown in FIG. 9 will be described hereinafter relative to the various functions accomplished thereby.

Figure 6:
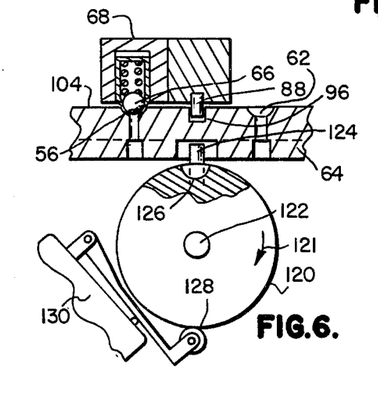
FIG. 6 is an enlarged fragmentary sectional view taken from the line 6—6 of FIG. 3.

The arm 68 also carries a guide pin 88 which is shown in FIGS. 4 and 6 of the drawings. The guide pin 88 is adapted to traverse a serpentine shaped track means designated 90 in FIG. 4 of the drawings; this track means 90, by way of example only, is recessed in the plate 64. As shown in FIG. 4 of the drawings, the relative disposition of the indexing detent means 66 and the guide pin 88 are shown. The serpentine track portion 90 is composed of a plurality of generally rectangular U-shaped track portions which are in continuity with each other. U-shaped portions 92 thereof are near one edge 94 of the plate 64 while other U-shaped portions 96 of the serpentine track are disposed adjacent the edge 98 of the plate 64.

Each U-shaped portion is provided with an intermediate portion 100 and a pair of parallel portions 102 such that one parallel portion of each U-shaped portion is in continuity with an adjacent parallel portion of an opposed U-shaped portion. Thus, the geometry of the serpentine track is such as shown in FIG. 4 of the drawings and on the same side of the plate 64 as are the detent portions 62, all as shown best in FIG. 6 of the drawings.

In accordance with the showing of FIG. 6, it will therefore be understood that the plate 64 is provided with an upper side 104 in which the serpentine track 90 is recessed and in which the recess portion 62 of the indexing portion 56 is disposed.

It will be obvious to those skilled in the art that while the indexing portions, as well as the track portion, are recessed, that other configurations, as for example projected portions, may be formed on the side 104 of the plate 64 in lieu of the recessed indexing portions and track portions.

Figure 5:
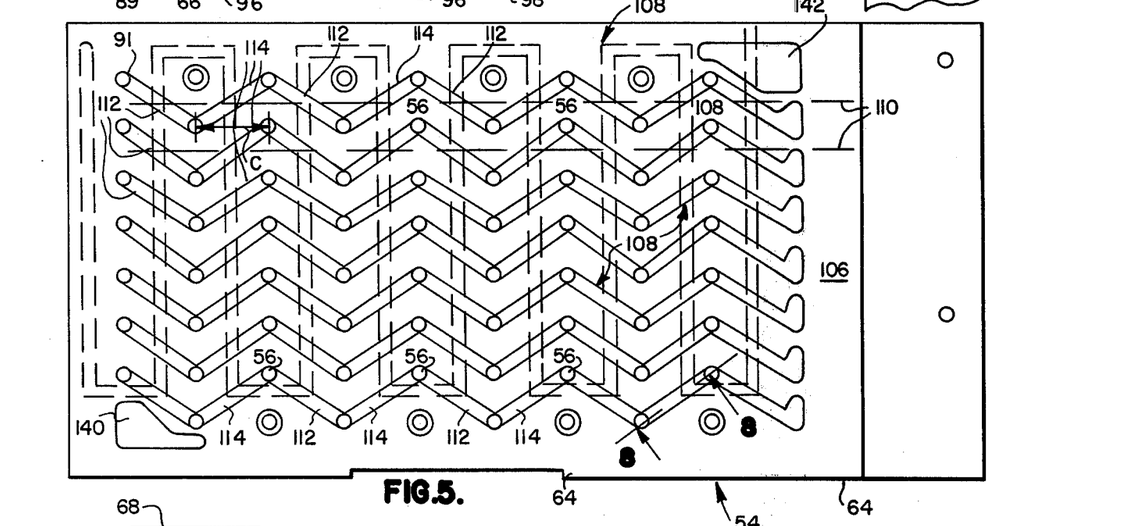
FIG. 5 is a fragmentary view taken from the line 5—5 of FIG. 2 showing the opposite side or bottom side of the indexing plate of the invention from that as shown in FIG. 4.
Figure 8:
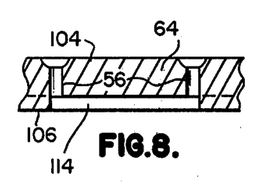
FIG. 8 is an enlarged fragmentary sectional view taken from the line 8—8 of FIG. 5.

As shown in FIG. 5 of the drawings, the plate 64 is provided with a lower side 106 which is also shown in FIGS. 7 and 8. It will be seen that FIG. 8, taken from FIG. 5, is shown oriented right side up and in the same upright relationship as is FIG. 7 taken from FIG. 4. Thus, the relationship of the views 6, 7 and 8 are geometrically related to facilitate understanding of the structure.

Recessed in the lower side 106 of the plate 64 are a plurality of herring bone shaped cam assemblies 108. These herring bone cam assemblies 108 are directed generally in rows as represented by broken lines 110 in FIG. 5 of the drawings. These herring bone shaped cam portions are directed in zig-zag rows, as shown in FIG. 5, and generally these zig-zag rows are disposed in intersecting relation with the parallel portion 102 of the U-shaped portions of the serpentine track 90 hereinbefore described. The rows 110 of the herring bone cam portions are each provided with alternately directed first cam portions 112 which are directed at acute angles to the broken lines 110, while second portions 114 of these herring bone shaped assemblies 108 are directed at a different acute angle and the angular portions 114 and 112 intersect at the indexing portions 56 hereinbefore described.

As shown in FIG. 7 of the drawings, the cam portions 108 are recessed in the lower side 106 of the plate 64 and as shown in FIG. 9 of the drawings, one of the angular portions 114 of the cam portions 108 extends from one of the indexing portions 56 to an adjacent one of the indexing portions 56 in a diagonal direction as indicated in FIG. 5 of the drawings.

Figure 3:
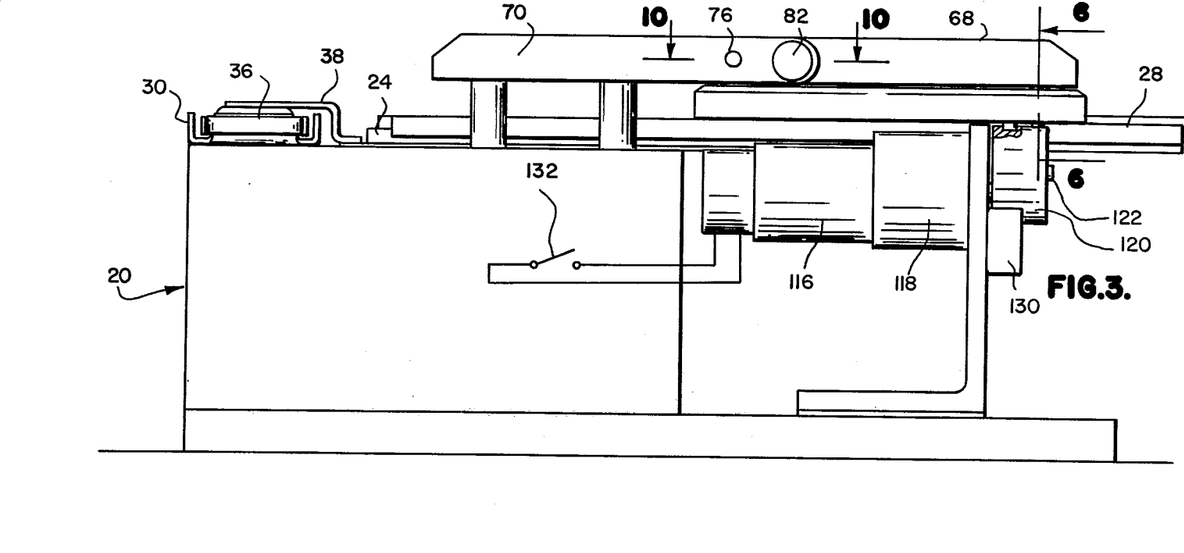
FIG. 3 is an enlarged end view taken from the line 3—3 of FIG. 2.

As shown in FIGS. 3 and 6 of the drawings, a motor 116 is provided with a single revolution clutch 118 adapted to drive a cam rotor 120; the output of the single revolution clutch 118 is provided with a shaft 122 which carries the cam rotor 120. The cam rotor is provided with a projection 124 adapted to engage in the recessed herring bone cam portions 108 and the respective angularly disposed portions 112 and 114 thereof.

The cam rotor 120 is provided with a recess 126 adapted to be engaged by a roller 128 of a limit switch 130, which is adapted to cause cyclic interuption of the single revolution clutch 118 so as to limit each cyclic operation of the cam rotor 120 to almost precisely 360°.

It will be understood that the motor 116 may be a gear head motor, which does not require a single revolution clutch. The motor 116 may be a gear head motor which stops precisely relative to the supply or termination of electrical energy thereto. Such a motor may be a motor manufactured by the Pittman Corporation, a subsidiary of Penn Engineering and Manufacturing Corporation, Sellersville, Pa., 18960. The particular motor may be model GN8312, manufactured by Pittman Corporation. The output shaft of this motor may be controlled by simply utilizing the switch 130, as hereinbefore described, and depending upon the arcuate movement of the projection 96 shown in FIG. 6 of the drawings, the rotor may be provided with several recesses 126 engageable by the roller 128 of the switch 130; as for example, the recesses 126 may include a pair of recesses 180° apart or three recesses 120° apart if desired, and the afore-mentioned motor model GN8312 will stop precisely with relation to the engagement of the roller 128 in one of the recesses 126. Likewise, a corresponding projection 124 may be aligned with each recess 126. Therefore, several of these projections 124 may be spaced about the periphery of the rotor 120 in correspondence with the respective recesses 126.

Since the particular motor afore-mentioned may be precisely controlled in connection with a switch to energize and deenergize the same, a single revolution clutch is not necessary for the successful operation of the present invention. Therefore, one or more of the projections 124 corresponding with one or more of the recesses 126 may be utilized depending upon the degree of arcuate travel of the projection 124 as desired.

A switch 132 diagramatically shown in FIG. 3, is used to energize the motor 116 and the limit switch 130 is coupled in circuitry with the switch 132 so that the switch 130 starts the motor and the switch 132 stops the motor, all of which is well known to the art of single revolution clutch drives and controls.

With each revolution of the rotary cam member 120, the projection 124 either traverses one of the portions 114 or one of the portions 112 of the herring bone cam portions 108, depending upon the direction that the cam plate 64 is being moved.

As shown in FIG. 4 of the drawings, it will be seen that the indexing detent member 66 is engaged with one of the indexing recessed portions 56 and that the guide pin 88 is disposed at a corner of one of the U-shaped track portions of the serpentine track 90.

The guide pin 88 shown in FIG. 4 is in one of the intermediate portions 96 of the track 90 and one revolution of the cam rotor 120 will move the projection 124 into an end of one of the slotted track portions 114 which is aligned with the indexing detent 66 and inasmuch as the guide pin 88 is in the intermediate portions 96 of the respective U-shaped portion of the serpentine track, lateral movement of the plate 64 is prevented in the direction of an arrow B in FIG. 4 of the drawings and accordingly, the projection 124 moving in the direction of the arrow C in FIG. 5 of the drawings will move the plate 64 into a position wherein the detent 66 engages one of the indexing portions 56 which is labeled specifically 67 in FIG. 4 of the drawings. At this time, the plate will move such that the guide pin 88 assumes the position 89 and it will be borne in mind that the detent 66 and guide pin 89 are held in stationary position and that the plate will move in the direction of the arrow G in FIG. 4 of the drawings.

The next subsequent single revolution of the rotary cam member 120 is initiated by the switch 132 and during this revolution, the projection 124 will enter a respective portion designated 91 of the respective herring bone cam assembly 108 and due to the fact that the pin 89 has been aligned with a respective portion 93 of the serpentine track portion 90 as shown in FIG. 4 of the drawings, the camming action of the projection 124 in a respective angularly slotted portion 112 of the herring bone cam structure will cause the plate 64 to move in the direction of the arrow K in FIG. 4 of the drawings so that the detent 66 will then be engaged by one of the detent portions 56 which is specifically marked 95 in FIG. 4 of the drawings.

Accordingly, each successive revolution of the rotary cam member 120 will engage the projection 124 in a respective portion 112 of one of the herring bone assemblies 108 and the plate 64 will be moved in the direction of the arrow K successively until the last detent 56 in the same row; said detent being marked 97 in FIG. 4 of the drawings. At this time, the plate will be moved to such position that the respective intermediate portion 96 of a U-shaped portion of the track will be engaged by the guide pin 88 at a position specifically marked 99 in FIG. 4 of the drawings.

In the reverse direction, the projection 124 operates in the portions 114 of the herring bone cam assemblies 108 and thus, the shaft 122 and rotary cam member 120 may operate in the same direction of the arrow 121 in FIG. 6 of the drawings when moving the plate 64 generally in the direction of the arrow G as it progresses through the serpentine motion dictated by the track 90.

It will be understood that when the intermediate portions 92 of the track 90 are engaged with the guide pin 88 that the plate 64 may be moved in either the direction of the arrow G or the direction of the arrow H depending upon which portions of the herring bone cams are engaged; either the portions 114 or the portions 112 as desired.

Recesses 140 and 142 are disposed in the plate diagonally relative to the assemblies of herring bone cams 108 and these recesses are disposed to receive the projection 124 of a rotary cam 120 as it reaches the end of the travel of the plate as dictated by the serpentine track 90. Thus, the projection 124 may cycle in these recesses 140 or 142 as the case may be, until the arm 68 is raised to the broken line position and the plate 64 is again set to a desired location for movement in either the direction G or H and alternately moved laterally in accordance with the serpentine track 90 as hereinbefore described.

Figure 12:
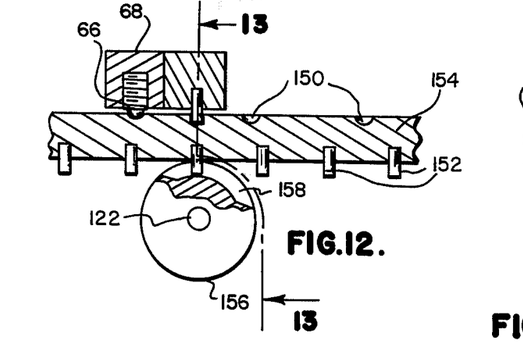
FIG. 12 is a fragmentary sectional view similar to FIG. 6 but showing a modification of the invention.
Figure 13:
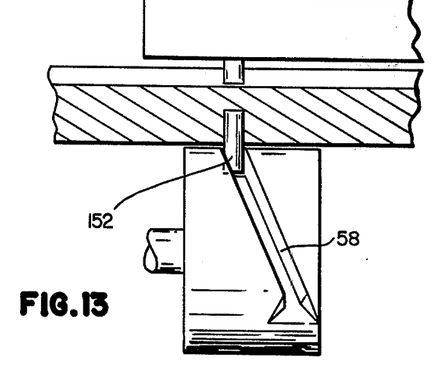
FIG. 13 is an enlarged fragmentary sectional view taken from the line 13—13 of FIG. 12.

In the modification, as shown in FIGS. 12 and 13, the indexing detent 66 engages detent recesses 150 similar to the recesses 62 hereinbefore described and an array of pins in zig-zag rows namely pins 152 project from the bottom of a plate 154 which is similar to the plate 64 hereinbefore described. The rotary cam member of the modification is designated 156 and is operable on the shaft 122 as hereinbefore described and with a single revolution clutch mechanism as described.

The rotor 156 is provided with a generally helical cam slot 158 which alternately engages the pins 152 for performing functions equivalent to that provided by the projection 124 and the recessed herring bone cams 108.

It will be obvious to those skilled in the art that various modifications may be resorted to without departing from the spirit of the invention:

I claim:

1. In a rectilinear micro fiche transport means; a frame; indexing means moveably mounted on said frame; a fiche carriage moveably mounted on said frame and connected to said indexing means; said indexing means and said carriage moveably in unison on said frame in two directions disposed at right angles to each other; said indexing means comprising a flat plate member; said plate member having opposite first and second sides; said first side having a plurality of equally spaced apart indexing portions arranged in intersecting rows; a first plurality of said rows being disposed in spaced apart parallel relation to each other and disposed in a first direction; a second plurality of said rows being disposed in spaced apart parallel relation to each other; said second plurality of said rows being disposed at substantially 90° with respect to and intersecting said first plurality of said rows; said indexing portions being common to both said first and second rows; said first side of said plate member also having a rectilinear track means comprising a series of adjacent opposed generally rectangular U-shaped portions disposed in continuity with each other; the U-shaped portion which are adjacent each other being opposed and in continuity with each other such that the continuity of U-shaped portions forms a unitary track which is alternately reversed in direction by means of each U-shaped portion; each U-shaped portion having an intermediate portion and a pair of spaced apart parallel portions disposed at substantially right angles to the respective intermediate portion; each one of said pair of spaced apart portions being in continuity with an opposed parallel portion of an adjacent U-shaped portion; said parallel portions of said U-shaped portions being disposed parallel to said rows of indexing portions; said second side of said plate member having rows of cam portions of generally herring bone shape; said rows of cam portions extending in zig-zag direction laterally with respect to said parallel portions of said U-shaped track portions; said rows of cam portions comprising first and second angularly disposed portions which are directed alternately at different angles to the direction of said parallel portions of said track portions; said first and second cam portions having adjacent ends disposed at transition proximities which substantially coincide with said indexing portions; an indexing detent means carried by said frame and disposed to be engaged by individual ones of said indexing portions; a guide member carried by said frame and engageable with said track means; a rotary cam means; means adapted for operating said rotary cam means and adapted to limit each rotary operation of said cam means; said cam means disposed to rotatably engage one of said herring bone cam portions during each operation of said rotary cam means; said rotary cam means having a rotary axis disposed at an angle to both said first and second cam portions.

2. The invention as defined in claim 1, wherein: said indexing detent means is provided with a spring loaded detent member; said indexing portions of said plate member being recessed to receive said detent member.

3. The invention as defined in claim 2, wherein: mounting means is provided for normally holding said indexing detent means in stationary position on said frame; said mounting means being moveably mounted on said frame and adapted to be moved to a position wherein said indexing detent means is out of interference with said indexing portions of said plate member; and means releaseably locking said mounting means in a fixed position in which said indexing detent means is engageable with said indexing portion of said plate member.

4. The invention as defined in claim 3, wherein: said mounting means also carries said guide member in position to engage said track means while said indexing detent means successively engages respective indexing portions of said plate member.

5. The invention as defined in claim 4, wherein: said rotary cam means is provided with a peripheral projection engageable with said cam means of said plate member; said rows of cam portions being recesses in said plate and engageable by said projection of said cam means.

6. The invention as defined in claim 1, wherein: said rotary cam means is provided with a peripheral portion engageable with said cam means of said plate member.

7. The invention as defined in claim 6, wherein: said rows of cam portions of said plate member being recesses therein.

8. The invention as defined in claim 1, wherein: said rows of cam portions of said cam means being recessed structure carried by said indexing means.

9. In a rectilinear micro fiche transport means; a frame; an actuator means; a micro fiche carriage moveably mounted on said frame; said actuator means and said carriage being connected together and disposed to move in two directions on said frame; said directions being disposed at right angles to each other; said actuator means comprising indexing means; said indexing means having a plurality of equally spaced apart indexing portions arranged in intersecting rows; a first plurality of said rows being disposed in spaced apart parallel relation to each other and disposed in a first direction; a second plurality of said rows being disposed in spaced apart parallel relation to each other; said second plurality of said rows being disposed at an angle with respect to and intersecting said first plurality of rows; said indexing portions being common to both said first and second rows; said indexing means also having a rectilinear track means comprising a series of adjacent opposed generally U-shaped portions in continuity with each other; the U-shaped portions which are adjacent each other being opposed and in continuity with each other such that the continuity of U-shaped portions forms a unitary track which is alternately reversed in direction by means of each U-shaped portion; each U-shaped portion having an intermediate portion and a pair of spaced apart parallel portions; each one of said pair of spaced apart portions being in continuity with an opposed parallel portion of an adjacent U-shaped portion; said parallel portions of said U-shaped portions being disposed parallel to said rows of indexing portions; said indexing means having a plurality of generally parallel rows of cam portions of generally herring bone shape; said rows extending in zig-zag disposition laterally with respect to said parallel portions of said U-shaped track portions; said rows of cam portions comprising first and second angularly disposed portions which are directed alternately at different angles to the direction of said parallel portions of said track portions; said first and second cam portions having adjacent ends disposed at transition proximities which substantially coincide with said indexing portions; an indexing detent means carried by said frame and disposed to be individually engaged by said indexing portions; a guide member carried by said frame and engageable with said track; means operating a motorized cam means; means disposed to intermittently cause cyclic operation of said cam means; said cam means disposed to engage one of said herring bone cam portions during each single cyclic operation of said cam means.

10. The invention as defined in claim 9, wherein: said indexing detent means is provided with a spring loaded detent member; said indexing portions of said indexing means being recessed to receive said detent member; said spring loaded detent member being deflectably moveable out of each respective recessed indexing portion when said indexing means is moved relative to said frame and said indexing detent means.

11. The invention as defined in claim 10, wherein: mounting means is provided for normally holding said indexing detent means in stationary position on said frame; said mounting means being movably mounted on said frame and adapted to be moved to a position wherein said indexing detent means is out of interference with said indexing portions of said indexing means; and means releaseably locking said mounting means in a fixed position in which said indexing detent means is engageable with said indexing portions of said indexing means.

12. The invention as defined in claim 11, wherein: said mounting means also carrying said guide member in position to engage said track means while said indexing detent means successively engages respective indexing portions of said indexing means.

13. The invention as defined in claim 9, wherein: said cam means is provided with a projection engageable with said cam means on said indexing means.

14. The invention as defined in claim 9, wherein: said cam means is provided with a projection engageable with said cam means of said indexing means; said rows of cam portions of said cam means being recessed structure carried by said indexing means.

15. In a rectilinear micro fiche transport means; a frame; an actuator means; a micro fiche carriage moveably mounted on said frame; said actuator means and said carriage being connected together and disposed to move in two directions on said frame; said directions being disposed at right angles to each other; said actuator means comprising indexing means; said indexing means having a plurality of equally spaced apart indexing portions arranged in intersecting rows; a first plurality of said rows being disposed in spaced apart parallel relation to each other and disposed in a first direction; a second plurality of said rows being disposed in spaced apart parallel relation to each other; said second plurality of said rows being disposed at substantially 90° with respect to and intersecting said first plurality of rows; said indexing portions being common to both said first and second rows; said indexing means also having a rectilinear track means comprising a series of adjacent opposed generally rectangular U-shaped portions in continuity with each other; the U-shaped portions which are adjacent each other being opposed and in continuity with each other such that the continuity of U-shaped portions forms a unitary track which is alternately reversed in direction by means of each U-shaped portion; each U-shaped portion having an intermediate portion and a pair of spaced apart parallel portions disposed at substantially right angles to the respective intermediate portions; each one of said pair of spaced apart portions being in continuity with an opposed parallel portion of an adjacent U-shaped portion; said parallel portions of said U-shaped portions being disposed parallel to said rows of indexing portions; said indexing means having a plurality of generally parallel rows of cam portions of generally herring bone shape; said rows extending in zig-zag disposition laterally with respect to said parallel portions of sid U-shaped track portions; said rows of cam portions comprising first and second angularly disposed portions which are directed alternately at different angles to the direction of said parallel portions of said track portions; said first and second cam portions having adjacent ends disposed at transition proximities which substantially coincide with said indexing portions; an indexing detent means carried by said frame and disposed to be individually engaged by said indexing portions; a guide member carried by said frame and engageable with said track means; a motorized rotary cam means; a rotary means adapted to limit each rotary operation of said cam means; said cam means disposed to rotatably engage one of said herring bone cam portions during each operation of said rotary cam means.

* * * * *